United States Patent Office 2,900,378
Patented Aug. 18, 1959

2,900,378

PROCESS FOR MODIFICATION OF OLEFIN POLYMERS

Clark O. Miller, Willoughby, Ohio, assignor to The Lubrizol Corporation, Wickliffe, Ohio, a corporation of Ohio No Drawing. Application December 10, 1956
Serial No. 627,114

17 Claims. (Cl. 260—139)

This invention relates to a process for the modification of polymeric compositions and in a more particular sense it relates to such a process which is especially applicable to substantially aliphatic polymers of mono-olefins. Still more particularly the process of this invention involves the incorporation into substantially aliphatic olefin polymers of phosphorus, sulfur and chlorine.

The treatment of olefin polymers with phosphorus- and sulfur-containing reagents has long been known and has been utilized widely for many different purposes. The treatment is exemplified by the reaction of a low molecular weight polymer of a low boiling olefin with phosphorous pentasulfide. This reaction apparently involves the olefinic portion of the polymer molecule, although it does not appear to be definitely established whether or not the reaction takes place at the olefinic double bond itself or at the carbon atom alpha to this double bond. In any event the principal result of such a reaction is the incorporation of phosphorus and sulfur into the polymeric chain and this product is susceptible of various further reactions leading to many useful products. Many variations of this specific example are known. Olefinic polymers of a wide range of molecular weights have been investigated in this process. Many phosphorus sulfides have been exploited, although phosphorus pentasulfide appears to have found widest usage. The reaction has been extended to copolymers and such copolymers have included those prepared from styrenes and substituted styrenes. The use of phosphorus pentasulfide jointly with elemental sulfur has been investigated and found to be useful for certain purposes. The subsequent treatment of these phosphorus- and sulfur-containing polymers with steam, basic neutralization agents, etc. has been the subject of much investigation. The value of certain catalysts for this reaction has been established in some instances.

The utility of the many compositions which have resulted from the reaction of olefin polymers with phosphorus- and sulfur-containing reagents has indicated the value of this type of reaction. Such products have been found to be useful chiefly as additives for use in mineral lubricants. The value of such products in other applications, likewise, has been well established. In almost all of such applications, including use in mineral lubricants, the value of the products has resided in the metal salts derivable from these acidic products. Such metal salts in turn appear to have been useful in direct proportion to the stoichiometric amount of metal in the oil-soluble salt. Recent developments in the preparation of such metal salts, i.e., those which contain stoichiometrically excessive amounts of metal, have enabled the preparation of such metal salts which contain unusually large amounts of metal, and as indicated before the value of these metal salts is in direct proportion to the stoichiometric amount of metal in the salt.

A principal object of the present invention is the provision of a process for the preparation of novel phosphorous- and sulfur-containing derivatives of olefin polymers.

Another object of the present invention is the provision of such a process by means of which products may be prepared which have an increased acidity over that of products prepared by previously-known processes.

Other objects of the invention will be apparent from the ensuing description thereof.

These objects are attained by the process of preparing phosphorus-, sulfur- and chlorine-containing compositions which comprises adding phosphorus trichloride to a mixture of sulfur and a substantially aliphatic olefin polymer at a temperature above 140° C., the mole ratio of the total amount of sulfur used to the total amount of phosphorus trichloride used being at least 1:1. The product which results from this process contains reactive chlorine and as such is susceptible to further modification with water, alcohols, phenols and basic reagents. The products which result from such modification steps are acids, esters or salts.

The olefin polymers of the above process are those derived principally from aliphatic mono-olefins. Such polymers may include minor amounts of other co-monomer units such as di-olefins or aromatic olefins. The olefins from which the polymers of this process are prepared are for the most part the low molecular weight olefins including chiefly ethylene, propylene and isobutylene. The reason for this rests not only with the commercial availability of these particular olefins and the polymers derivable therefrom, but also because of their particular utility in the process and the effectiveness of the products which result from their use in the process.

In general the lower molecular weight polymers of these olefins are more satisfactory than the higher molecular weight polymers. The term "lower molecular weight" is intended to mean a range of from 250 to 3000. Higher molecular weight polymers are useful in certain instances and the use of such higher molecular weight polymers is contemplated as being within the scope of this invention. In most cases, however, the use of such higher molecular weight polymers is less convenient for reasons of solubility and viscosity, not only in the process mixture but in subsequent uses of the product which results.

The use of copolymers in the process, likewise, is within the scope of the invention to the extent that such copolymers must be substantially aliphatic. Thus such copolymers which contain minor proportions of styrene or substituted styrene, or butadiene can be used in the process and the products which result are useful in certain applications.

The preparation of the olefin polymers which comprise the starting material of the process of this invention may be effected according to any of the various well-known polymerization techniques. A particularly useful method comprises the treatment of an olefin such as isobutylene at a temperature from about —60° C. to about 40° C. in the presence of a catalyst such as boron fluoride. The preparation of the particularly suitable low molecular weight polymers for this process may be carried out as follows: A hydrocarbon mixture containing about 25% of isobutylene is cooled to about —15° C. and from about 0.1% to about 2% of boron fluoride, based upon the isobutylene content of the material treated, is added with vigorous agitation. The exothermic nature of the polymerization requires efficient cooling. When the polymerization has subsided the reaction mass is neutralized and washed free of acidic substances arising from the catalyst. The resulting polymer is separated from the unreacted hydrocarbons by distillation. The residual polymer so obtained, depending upon the temperature of reaction, contains polymeric chains having molecular weights within the range of 100 to 2000.

Higher molecular weight olefin polymers may be obtained by other well-known methods, viz., low temperature polymerization with boron fluoride catalysts, or high pressure, high temperature conditions with a free-radical type of catalyst. Other catalysts may be used, particularly in the preparation of the lower molecular weight polymers; these include aluminum chloride, stannic chloride, zinc chloride, phosphoric acid, sulfuric acid, etc. Such catalysts as chromium oxide, nickel oxide, molybdenum oxide, aluminum triethyl and zinc dimethyl have been found to be of value also as catalysts for these polymerizations.

A notable characteristic of the process of this invention is the temperature which is required for the reaction. It is necessary that the temperature be maintained throughout the reaction at 140° C. or higher. At temperatures below this minimum the reaction of this process does not take place. This temperature limitation imposes a manipulative limitation also on the process because the boiling point of phosphorus trichloride is 76° C. which is considerably lower than that of the required reaction temperature for this process. It is apparent, therefore, that the phosphorus trichloride must be added portionwise to the process mixture and that this portionwise addition must be governed by the rate of reaction of the phosphorus trichloride. This holds in all cases except where the process is carried out in a closed system under pressure so that the phosphorus trichloride is not allowed to escape from the system. Ordinarily, however, the process is carried out in an open system and the phosphorus trichloride is added portionwise to the process mixture.

The sulfur, likewise, may be added portionwise to the process mixture or, alternatively, it may be incorporated into the reaction mixture at the start and the phosphorus trichloride added portionwise to the mixture of sulfur and olefin polymer.

The over-all reaction is thought to involve first sulfurization of the olefin polymer and then reaction of this sulfurized polyolefin with the phosphorus trichloride. Sulfurization of olefin polymers is well known so that it will be seen that the process of this invention is concerned primarily with the reaction of phosphorus trichloride with a sulfurized olefin polymer. The basis for the belief that the reaction of this process is in reality a sequence of the two reactions specified above is the observation that the product of a process comprising these two steps, namely the sulfurization of a polyolefin followed by reaction of the sulfurized polyolefin with phosphorus trichloride, is substantially identical with the product obtained by the addition of phosphorus trichloride to a mixture of the olefin polymer and sulfur. Furthermore each of the above products is substantially identical with the product obtained by a process in which the phosphorus trichloride and sulfur each are added portionwise to the olefin polymer.

As noted previously the minimum temperature required for the successful operation of the hereindescribed process is 140° C. Below this temperature the reaction of this process takes place only to a negligible extent. The upper limit of the temperature range within which this process may be carried out is restricted only by the volatility of the phosphorus trichloride and the point at which decomposition of the olefin polymer or the reaction product takes place. If the reaction is conducted in a closed system the volatility of the phosphorus trichloride is no longer a deterrent to the use of high temperatures. Ordinarily, however, it is preferred to maintain the temperature within the range of 150° C. to about 250° C. Because of the low boiling point of the phosphorus trichloride the reaction vessel, if an open system is used, should be equipped with means for returning volatilized unreacted phosphorus trichloride to this system. Such means in most cases can be provided by a reflux condenser. In order to minimize the loss of unreacted phosphorus trichloride from the process mixture it also is desirable in many cases to add this reagent by introducing it portionwise beneath the surface of the reaction medium and thereby causing it to bubble up through the mixture.

The molecular structure of the product which results from the process described herein is not known. It is known, however, that virtually all of the chlorine is loosely bound and susceptible to removal by hydrolysis; furthermore in view of the relative stability toward hydrolysis of most of the phosphorus in the product it appears that this phosphorus is bound directly to carbon; still further the potential acidity of the product which results from hydrolysis of the chlorine-containing product of this process is such as to indicate approximately two equivalents of acid per atom of phosphorus.

Products which are available from prior art processes involving the reaction of olefinic compounds with phosphorus sulfides are characterized by an acidity which can be explained on the basis of one equivalent of acid per atom of phosphorus. It is readily apparent then that the products of the invention described and claimed herein are more acidic than those of the prior art; i.e., they are more acidic per atom of phosphorus present in the product.

This is a particularly significant difference in view of the observation stated before that the effectiveness of such phosphorus- and sulfur-containing products is in many instances directly related to the ability of such products to combine with large amounts of metal. The products of this invention, having twice as much acidity as the products of the prior art, are obviously capable of neutralizing twice as much of a basic metal compound. As a consequence compositions containing unusually large amounts of metal can be prepared from the products of the process of this invention as compared with the products of the prior art.

The process of the invention may be illustrated in more detail by the following examples.

EXAMPLE 1

A mixture of 18 grams (0.54 mole) of sulfur and 268 grams (0.27 mole) of polyethylene having an average molecular weight of 500–1500 was heated to 170° C. To this mixture there was added portionwise 74 grams (0.54 mole) of phosphorus trichloride at 170–180° C. during a period of 30 minutes. The reaction mass was heated at 200–217° C. for 1 hour and then at 190° C./50 mm. for 30 minutes. The residue, weighing 309 grams (97% of the theoretical yield), was found to have the following analyses:

Percent P _____ 4.39
Percent S _____ 6.07
Percent Cl _____ 5.51

EXAMPLE 2

To a mixture of 1200 grams (3.7 moles) of polyisobutylene having an average molecular weight of 300–350 and 128 grams (4.0 moles) of sulfur, there was added at 172–235° C. portion-wise 552 grams (4.0 moles) of phosphorus trichloride during a period of 9 hours. The reaction mixture was heated at 170–190° C./60 mm. for 30 minutes. Steam was passed through the residue for 30 minutes at 160–215° C. The hydrolyzed product was dried at 170–190° C./20 mm. and then filtered. The filtrate weighed 1162 grams (80% of the theoretical yield) and was found to have the following analyses:

Percent P _____ 6.46
Percent S _____ 3.29
Percent Cl _____ 0.2
Acid No. _____ 61

EXAMPLE 3

To 1700 grams (2.3 moles) of polyisobutylene having an average molecular weight of 700–800 there was added 326 grams (10.2 moles) of sulfur, and the mixture was heated to 150° C. To this mixture at 150° C. there was added 480 grams (3.6 moles) of phosphorus trichloride during a period of 1 hour. The reaction mixture was heated at 212° C. for 1 hour and the residue was diluted with 850 grams of mineral oil. This oil solution, weighing 2893 grams (93% of the theoretical yield), was found to have the following analyses:

| | |
|---|---|
| Percent P | 3.36 |
| Percent S | 9.4 |
| Percent Cl | 0.43 |

EXAMPLE 4

A mixture of 155 grams (4.9 moles) of sulfur and 5291 grams (0.4 mole) of polyisobutylene having an average molecular weight of above 12500 was heated to 168° C. To this mixture there was added at 168–177° C., 667 grams (4.9 moles) of phosphorus trichloride throughout a period of 2.5 hours. The mixture was heated at 182–195° C. for 1.25 hours and then at 170–180° C./50 mm. Steam was passed through the above mixture at 150–175° C. for 4 hours. The residue was dried and yielded 3478 grams (98% of the theoretical yield) of a product found to have the following analyses:

| | |
|---|---|
| Percent P | 1.44 |
| Percent S | 0.44 |
| Percent Cl | 0.17 |
| Acid No. | 47 |

EXAMPLE 5

To a mixture of 128 grams (4.0 moles) of sulfur and 1500 grams (1.1 moles) of polyisobutylene having an average molecular weight of 1200–1550 there was added at 175–220° C. 552 grams (4.0 moles) of phosphorus trichloride beneath the surface of the reaction mass throughout a period of 13 hours. The mixture was heated to 230° C. and then at 170° C./30 mm. The mixture then was diluted with 750 grams of mineral oil, and steam was passed through the oil solution at 170–190° C. for 1.5 hours. The hydrolyzed product then was dried and found to have the following analyses:

| | |
|---|---|
| Percent P | 3.61 |
| Percent S | 1.64 |
| Percent Cl | 0.15 |
| Acid No. | 88 |

To a mixture of 1250 grams (2.5 moles) of the above product, 1490 grams of mineral oil and 100 grams of water, there was slowly added at 30° C., 201 grams (1.3 moles) of barium oxide. The reaction mass was heated to 90–100° C. to complete the reaction and then dried at 150–160° C./30 mm. The residue then was filtered. The filtrate, weighing 2691 grams (93% of the theoretical yield), was found to have the following analyses:

| | |
|---|---|
| Percent P | 1.41 |
| Percent S | 0.66 |
| Percent Ba | 5.19 |
| Acid No | 0.6 |

EXAMPLE 6

To a mixture of 1700 grams (2.3 moles) of polyisobutylene having an average molecular weight of 700–800 and 326 grams (10.2 moles) of sulfur, there was added at 148–150° C. 480 grams (3.6 moles) of phosphorus trichloride beneath the surface of the reaction mass throughout a period of 5 hours. Near the end of the reaction, 850 grams of mineral oil was added to the mixture and the mixture was heated to 212° C. To 1645 grams (2.9 moles) of the above oil solution, 200 grams of water and 1000 ml. of benzene, there was added at 85° C. 459 grams (1.5 moles) of barium hydroxide octahydrate. The mixture was heated at reflux for 4 hours and dried by azeotropic distillation. Benzene was then removed by heating the mixture at 120° C./12 mm. The residue weighed 1390 grams and had the following analyses:

| | |
|---|---|
| Percent P | 2.74 |
| Percent S | 5.63 |
| Percent Ba | 10.5 |
| Acid No | Trace |

EXAMPLE 7

To 2141 grams (0.8 mole) of polyethylene having an average molecular weight of 2500–2740 there was added at 170–185° C. 137 grams (4.3 moles) of sulfur in small portions, and following the addition of the first portion of sulfur there was added gradually 590 grams (4.38 moles) of phosphorus trichloride throughout a period of 7 hours. Thereafter the reaction mixture was heated at 180–200° C. for 2 hours and then at 185° C./35 mm. The residue weighed 2425 grams (93.5% of the theoretical yield) and had the following analyses:

| | |
|---|---|
| Percent P | 2.88 |
| Percent S | 4.41 |
| Percent Cl | 3.63 |

To a mixture of 342 grams (0.25 mole) of the above product, 25 grams of pyridine, and 500 ml. of benzene, there was added 24 grams (0.16 mole) of 2-ethylhexane-1,3-diol. The mixture was refluxed at 85° C. for 10 hours, washed with water and heated to 120° C./30 mm. to remove volatile substances. The residue weighed 345 grams (98.% of the theoretical yield) and had the following analyses:

| | |
|---|---|
| Percent P | 2.99 |
| Percent S | 3.59 |
| Percent Cl | 0.04 |

EXAMPLE 8

To 1000 grams (0.95 mole) of a hydrocarbon polymer having a molecular weight of about 1000–1100 (prepared by polymerization of a mixture of olefinic monomers having and average molecular weight approximately 90 and composed essentially of dienes and reactive olefins) there was added at 180–200° C. 43 grams (1.33 moles) of sulfur in small portions and following the addition of the first portion of sulfur there was added in small portions 185 grams (1.33 moles) of phosphorus trichloride. The mixture was heated at 220° C. for 1 hour and then at 200° C./30 mm. The residue was diluted with 1000 grams of mineral oil and the oil solution, weighing 2078 grams (87.5% of the theoretical yield), was found to have the following analyses:

| | |
|---|---|
| Percent P | 1.32 |
| Percent S | 1.84 |
| Percent Cl | 1.2 |

EXAMPLE 9

Sodium 2-ethylhexyl alcoholate was prepared by adding 11 grams (0.47 mole) of sodium to 600 ml. of 2-ethylhexyl alcohol at 130° C. To this mixture there was added a solution of 243 grams (0.38 mole) of a phosphorus-, sulfur-, and chlorine-containing compound prepared according to Example 1 in 500 ml. of benzene. The mixture was refluxed at 90° C. for 8 hours, washed with water, and the organic portion heated to 150° C./5 mm. to remove all volatile substances such as water, benzene and excess 2-ethylhexyl alcohol. The residue weighed 192 grams and had the following analyses:

| | |
|---|---|
| Percent P | 4.32 |
| Percent S | 5.8 |
| Percent Cl | 0.61 |
| Percent Na | 0.03 |

EXAMPLE 10

A mixture of 6000 grams (8 moles) of polyisobutylene having an average molecular weight of 700–800, and 560 grams (17.5 moles) of sulfur was heated slowly to 180° C. in 3 hours and then at 180° C. for 1.5 hours. To this mixture there was added portionwise at 180–183° C. 1210 grams (8.8 moles) of phosphorus trichloride throughout a period of 3.2 hours. The mixture then was diluted with 1500 grams of mineral oil. The oil solution was cooled to 149° C. and 830 grams of steam was passed through the mixture at 145° C. during a period of 7 hours. The resulting product was dried by heating at 149° C./15 mm. for 0.5 hour and then was diluted further with 1320 grams of mineral oil. The yield of the oil solution of the product was 8950 grams. To a mixture of 3623 grams (4.6 moles) of this product, 181 grams of water, and 90 grams of methyl alcohol, there was added 180 grams (2.4 moles) of calcium hydroxide at 60° C. during a period of 30 minutes. The mixture was refluxed at 70° C. for 2 hours, heated at 150° C. for 30 minutes to remove water and methyl alcohol, and filtered. The filtrate weighed 3382 grams (91.2% of the theoretical yield) and had the following analyses:

Percent P _____ 2.24
Percent S _____ 1.96
Percent Ca _____ 2.33

EXAMPLE 11

A mixture of 750 grams (1.0 mole) of polyisobutylene having an average molecular weight of 700–800 and 128 grams (4.0 moles) of sulfur was heated to 130° C. To this mixture there was added portionwise 276 grams (2.0 moles) of phosphorus trichloride at 150–205° C. throughout a period of 2 hours. The mixture was diluted with 375 grams of mineral oil. Steam was passed through the oil solution at 170–190° C. for 0.5 hour and the oil solution then was dried at 160–180° C./60 mm. The residue, weighing 1225 grams (97% of the theoretical yield), was found to have the following analyses:

Percent P _____ 3.99
Percent S _____ 2.48
Percent Cl _____ 0.1
Acid No _____ 90

To a mixture of 758 grams (1.2 moles) of the above product and 797 grams of mineral oil there was added 52.5 grams (0.6 mole) of zinc oxide. The mixture then was heated at 135° C. for 2 hours. The water formed during neutralization was removed by heating at 158° C. for 2.5 hours. The residue was filtered. The filtrate weighed 1485 grams (93% of the theoretical yield) and was found to have the following analyses:

Percent P _____ 1.82
Percent S _____ 1.16
Percent Zn _____ 2.47
Acid No. _____ 0

EXAMPLE 12

To 1214 grams (1.2 moles) of a copolymer of isobutylene and styrene having an average molecular weight of about 1000, obtained by copolymerization of the two monomers respectively in 10.5:1 molar ratio at −20° to 10° C. using n-hexane as a solvent and boron trifluoride as the Friedel-Crafts catalyst, there was added at 170–205° C. 104 grams (3.24 moles) of sulfur in small portions. Following the addition of the first portion of sulfur, there was added portionwise 445 grams (3.24 moles) of phosphorus trichloride. The mixture was heated at 170° C. 50 mm. for 1 hour. The residue weighing 1434 grams (93.4% of the theoretical yield) was diluted with 607 grams of mineral oil and found to have the following analyses:

Percent P _____ 3.01
Percent S _____ 4.73
Percent Cl _____ 2.71

EXAMPLE 13

To 5000 grams (6.67 moles) of polyisobutylene having an average molecular weight of 700–800 there was added at 180–190° C. 167 grams (8.35 moles) of sulfur in small portions, and following the addition of the first portion of sulfur, there was added 1148 grams (8.35 moles) of phosphorus trichloride in small portions below the surface of the reaction mass. The mixture was heated at 190–200° C. for 2 hours and then at 200–210° C./30 mm. for 0.5 hour. The residue was diluted with 2480 grams of mineral oil, and the oil solution was found to have the following analyses:

Percent P _____ 2.4
Percent S _____ 3.22
Percent Cl _____ 3.4

A mixture of 1185 grams (1.0 mole) of the above product and 455 grams (1.0 mole) of a polyisobutyl phenol (obtained by alkylation of phenol with an equimolar amount of a polyisobutylene having an average molecular weight of 300–350 in the presence of sulfuric acid as the Friedel-Crafts catalysts) was heated at 240–265° C. for 16 hours in a nitrogen atmosphere. The residue weighted 1574 grams (98% of the theoretical yield) and had the following analyses:

Percent P _____ 1.72
Percent S _____ 1.93
Percent Cl _____ 0.19
Saponification No. _____ 33
Acid No. _____ 0.7

EXAMPLE 14

To a mixture of 980 grams (30.6 moles) of sulfur and 5100 grams (6.8 moles) of polyisobutylene having an average molecular weight of 700–800 there was added at 170–182° C. 1400 grams (10.2 moles) of phosphorus trichloride throughout a period of 4 hours beneath the surface of the reaction mass. The reaction mixture was heated to 210° C. and was diluted with 2270 grams of mineral oil. The oil solution had the following analyses:

Percent P _____ 3.01
Percent S _____ 8.79
Percent Cl _____ 0.44

Steam was passed through 3412 grams of the above oil solution at 150° C. for 5 hours. The resulting product was dried by heating at 150° C. for 3 hours while air was passed through the reaction mass. The residue then was filtered. The filtrate, weighing 2924 grams (86.5% of the theoretical yield) was found to have the following analyses:

Percent P _____ 3.06
Percent S _____ 3.5
Percent Cl _____ 0.03
Acid No _____ 84.1

EXAMPLE 15

To a solution of 1000 grams (0.43 mole) of a phosphorus-, sulfur-, and chlorine-containing compound (prepared as in Example 8) in 500 ml. of benzene, there was added 392 grams (4.4 moles) of isopropanol and 33 grams of barium oxide as a catalyst. The reaction mixture was heated at reflux for 10 hours and filtered. The last traces of benzene were removed from the filtrate by heating to 150° C./20 mm. The product weighed 973 grams (96% of the theoretical yield) and had the following analyses:

Percent P _____ 1.3
Percent S _____ 1.78
Percent Cl _____ 0.44
Percent Ba _____ Trace
Saponification No. _____ 41

EXAMPLE 16

To 867 grams (0.33 mole) of polyethylene having an average molecular weight of 2500–2740 there was added at 170° C. 168 grams (5.75 moles) of sulfur in small portions, and following the addition of the first fraction of sulfur, there was added gradually 485 grams (3.5 moles) of phosphorus trichloride throughout a period of 12 hours. The mixture was heated to 160–170° C. and diluted with 430 grams of mineral oil. The solution weighed 1589 grams (93.5% of the theoretical yield) and had the following analyses:

| | |
|---|---|
| Percent P | 5.09 |
| Percent S | 9.75 |
| Percent Cl | 3.44 |

To a mixture of 1075 grams (1.04 moles) of the above product, 1000 ml. of benzene, and 270 grams (1.35 moles) of tridecyl alcohol, there was added at 85° C. 107 grams of pyridine as the catalyst. The mixture was refluxed at 85° C. for 10 hours, washed with water and heated at 100° C./30 mm. to remove volatile substances. The residue weighed 1354 grams (100% of the theoretical yield) and was found to have the follow analyses:

| | |
|---|---|
| Percent P | 3.03 |
| Percent S | 4.89 |
| Saponification No. | 110 |

The compositions of this invention are useful in many applications. For example, the substantially neutralized products of the phosphorus-, sulfur-, and chlorine-containing compounds prepared in accordance with this invention, e.g., the salts, esters, and amides thereof, are useful as organic surface-active agents, insecticides, etc. More particularly, the metal salts of the phosphorus-, sulfur-, and chlorine-containing compounds may be used, for example, as wetting agents in asphalt emulsions; as dispersant agents in lubricants; as light and heat stabilizers in plastic compositions; as insecticides, as paint-driers; etc. The esters and the amides of the phosphorus-, sulfur-, and chlorine-containing compounds may, for example, be used as metal-free dispersants or detergents in lubricants; as insecticides; as plasticizers; etc. In these respects, the compositions of this invention may be employed in concentrations ranging sometimes from about 0.01% to about 20%, and more often from about 0.05% to about 5% based on the weight of the total compositions. When employed within the foregoing specified effective concentration ranges, the products of this invention are usually compatible with other ingredients present in the compositions. Since small percentages of the products of this invention in the various applications often give sufficient improvement, it is seldom of extreme importance that the addition agents be completely soluble in all proportions. Also, certain compounds are of value as gelling or bodying agents when used in amounts greater than are strictly soluble. In incorporating the products of this invention into the various end compositions, which may be in the form of a homogeneous solution, a dispersion, a suspension, or an emulsion, there is usually little difficulty encountered, especially if the incorporation is effected with the assistance of mechanical dispersing means such as vigorous agitation or ultrasonic radiation.

Specific examples illustrating a few of the various fields of application of the products of this invention include the following:

*Use in halogen-bearing plastic as stabilizer*

| | Percent |
|---|---|
| Polyvinyl chloride | 59.2 |
| Plasticizer | 40 |
| Product of Example 16 | 0.8 |

*Use as insecticide*

| | Percent |
|---|---|
| Inert solvent | 2.0 |
| Emulsifier | 0.05 |
| Product of Example 3 | 0.07 |
| Water | Balance |

*Use in lubricant*

| | Percent |
|---|---|
| SAE 20 motor oil | 90 |
| $P_2S_5$-treated turpentine | 0.5 |
| Zn-di-n-hexylphosphorodithioate | 2.0 |
| Viscosity Index improver | 3.2 |
| Product of Example 5 | 4.3 |

*Use in asphalt emulsions as wetting agents*

| | Percent |
|---|---|
| Product of Example 10 | 0.2 |
| Asphalt | 65 |
| Water | 34.8 |

As mentioned earlier the phosphorus-, sulfur-, and chlorine-containing compositions of this invention are susceptible to modification by reaction with water, alcohols, phenols, and basic reagents. The alcohols which may be so used to modify these products include not only the monohydric, but also the polyhydric alcohols. Thus methanol, 2-ethylhexanol, ethylene glycol, glycerol, butynediol, etc. are all suitable alcohols for the purpose of such modification. The basic reagents which may be used satisfactorily for this purpose include not only the metallic basic compounds such as sodium hydroxide, barium oxide, calcium oxide, etc. but also ammonia and amines. Suitable amines include ethylene diamine, n-butyl amine, octadecyl amine, pyridine, piperidine etc. The use of alcohols as modifying agents involves the use also of an alkaline catalyst which serves to react with the by-product hydrogen chloride.

The use of amines in this step results in the formation of amides. It is apparent, of course, that the use of tertiary amines results in the formation of salts and not in the formation of such amides.

Other modes of applying the principle of the invention may be employed, change being made as regards the details described, provided the features stated in any of the following claims or the equivalent of such be employed.

I therefore particularly point out and distinctly claim as my invention:

1. The process of preparing phosphorus-, sulfur-, and chlorine-containing compositions which comprises adding phosphorus trichloride to a mixture of sulfur and a substantially aliphatic olefin polymer at a temperature above 140° C. but below the decomposition point of the components of the reaction mixture, the mole ratio of the total amount of sulfur used to the total amount of phosphorus trichloride used being at least 1:1 and the mole ratio of the total amount of phosphorus trichloride used to the total amount of substantially aliphatic olefin polymer used being at least 1:1.

2. The process of claim 1 characterized further in that the olefin polymer has an average molecular weight of from 250–3000.

3. The process of claim 1 characterized further in that the olefin polymer is a polymer of an olefin containing less than 6 carbon atoms.

4. The process of claim 1 characterized further in that the olefin polymer is derived from isobutylene.

5. The process of claim 1 characterized further in that the olefin polymer is derived from ethylene.

6. The process of claim 1 characterized further in that the olefin polymer is a copolymer.

7. The process of claim 1 characterized further in that the olefin polymer is a copolymer of a mono-olefin and a di-olefin.

8. The process of claim 1 characterized further in that the olefin polymer is a copolymer of isobutylene and styrene.

9. The process of claim 1 characterized further in that the phosphorus trichloride and sulfur are added portionwise and simultaneously to the olefin polymer.

10. The process of claim 1 characterized further in that the product available therefrom is modified by reaction with a basic metal compound.

11. The process of claim 1 characterized further in that the product available therefrom is modified by reaction with a phenolic compound.

12. The process of claim 1 characterized further in that the product available therefrom is modified by reaction with an alcohol.

13. The process of claim 1 characterized further in that the product available therefrom is modified by reaction with an alcoholate.

14. The process of claim 1 characterized further in that the product available therefrom is modified by reaction with water.

15. The process of preparing phosphorus-, sulfur-, and chlorine-containing compositions which comprises adding phosphorus trichloride to a mixture of a polyisobutylene having a molecular weight within the range of 250-3000 and sulfur at a temperature above 140° C., the mole ratio of the total amount of sulfur used to the total amount of phosphorus trichloride used being at least 1:1 and the mole ratio of the total amount of phosphorus trichloride used to the total amount of substantially aliphatic olefin polymer used being at least 1:1, treating the resulting product with steam, and modifying the steam-treated product by reaction with a basic alkaline earth metal compound.

16. The product prepared by the process of claim 1.

17. The product prepared by the process of claim 15.

References Cited in the file of this patent

UNITED STATES PATENTS

| | | |
|---|---|---|
| 2,356,074 | May | Aug. 15, 1944 |
| 2,507,731 | Mixon | May 16, 1950 |
| 2,721,862 | Brennan | Oct. 25, 1955 |